E. W. BRACKENBURY.
AUTOMATIC WATER WEIGHING DEVICE.
APPLICATION FILED JAN. 8, 1917.

1,272,368. Patented July 16, 1918.

WITNESSES
Arnold Reuss
Raymond Springer

Edward W. Brackenbury
A. E. Smith, Atty.

UNITED STATES PATENT OFFICE.

EDWARD W. BRACKENBURY, OF MILWAUKEE, WISCONSIN, ASSIGNOR TO THE T. L. SMITH COMPANY, OF MILWAUKEE, WISCONSIN, A CORPORATION OF WISCONSIN.

AUTOMATIC WATER-WEIGHING DEVICE.

1,272,368.   Specification of Letters Patent.   Patented July 16, 1918.

Application filed January 8, 1917.  Serial No. 141,101.

*To all whom it may concern:*

Be it known that I, EDWARD W. BRACKENBURY, a subject of the King of England, residing at Milwaukee, in the county of Milwaukee and State of Wisconsin, have invented a new and useful Automatic Water-Weighing Device, of which the following is a specification.

The objects of my invention are to provide means for accurately and quickly measuring a given quantity of water automatically, regardless of the head of water or pressure in the supply pipe, holding such measured charge of water ready for periodic distribution in continuously operating mixing machinery, and for readily adjusting the quantity of water to be measured in each charge.

I attain these objects by the mechanism illustrated in the accompanying drawing, in which—

The framework of my device consists of a rectangular receiving tank open at the top, formed of flat plates and angles around the edges to stiffen the structure. The ends of this tank are marked 1 and 2, and the top and bottom angles on the sides thereof are marked 3 and 4 respectively.

Figure 2:
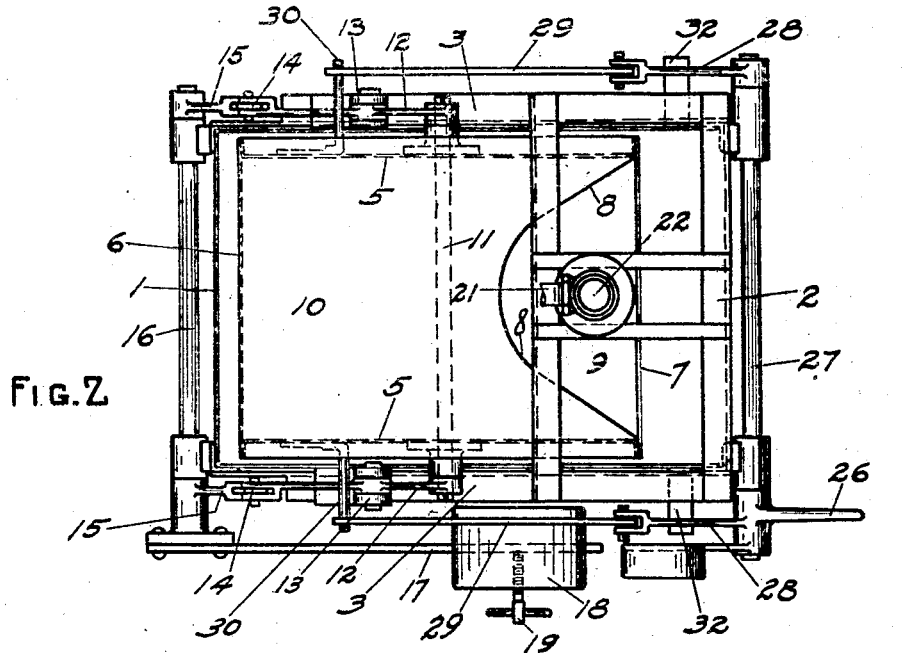
Fig. 2 shows a plan view of my device.
Figure 1:
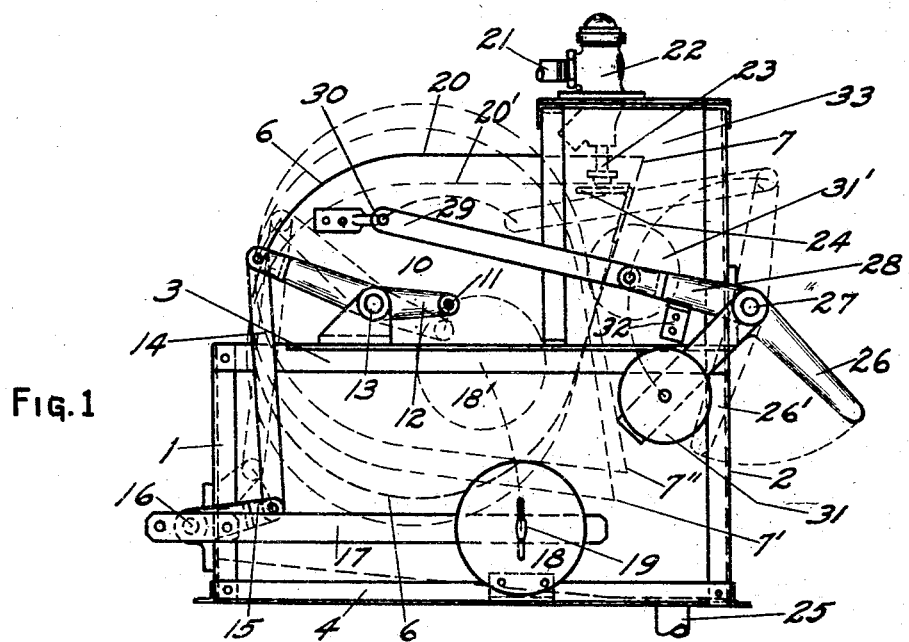
Figure 1 shows a side elevation.

The measuring tank 10 is pivotally supported partly above and partly inside of the receiving tank. This measuring tank is generally cylindrical in form but has a delivery spout or lip projecting from one side thereof throughout its length. The ends of this tank are marked 5, the cylindrical periphery is 6, and the discharge lip 7. This measuring tank also is open at the top for a distance back from the lip 7 as shown by the curved line 8 in Fig. 2, forming the opening 9.

Tank 10 is supported by a rod or shaft 11 coincident with its axis of figure and attached to each of its ends 5. Shaft 11, at each end, is movably mounted in the ends of lever arms 12, 12, which levers are fulcrumed in the bearing brackets 13, 13, on the top angles 3 of the receiving tank. The outside ends of levers 12 are connected by links 14 to crank arms 15 which are fast on the shaft 16. Attached to one end of shaft 16 is the weight lever 17 carrying the weight 18 held in adjusted position on 17 by the set screw 19. When the tank 10 has received the quantity of water for which the weight 18 is set, the tank falls, its top line 20 moving to the dotted position 20′, and the weight 18 through its connecting system of levers and links rising to the dotted position 18′.

Water is supplied through the pipe 21 to the valve 22 which has a depending stem 23. The bracket 24 on the tank 10 engages the stem 23 and opens the valve as the weight 18 goes down and the tank 10 moves up. Water flows into tank 10 until the weight of the water causes the tank 10 to sink and the weight 18 to rise, when the valve 22 automatically closes. The water is therefore measured by weight.

After the measured quantity of water is in tank 10, and the tank has settled into its lower position, it remains there undisturbed until the water is needed in the operation of the machine of which the tank is a part, when the tank is tilted on its shaft 11 in the end bearings of levers 12. In its tilted position the lip 7 swings to the position 7′ and the water flows out of tank 10 into the square receiving tank and passes thence to the machine through the outflow pipe 25 in the bottom of the receiving tank. As the water flows out of tank 10, the tank rises, the lip moving from 7′ to the position 7″, while the weight 18 descends to its lowest position.

This tilting movement of tank 10 is accomplished by the lever arm 26 fast on the shaft 27 being moved to the position 26′ either by hand or by some moving part of the machine, as in the case of a concrete mixer, the loading skip.

The lever arms 28 are connected by links 29 to pins 30 which are fast to the ends of tank 10 near its periphery. As the lever arm 26 moves to 26′ the counterweight 31 is raised to 31′ so that, as soon as the moving force is removed from 26, the counterweight will swing the tank back to its upright position and as it so swings the bracket 24 will strike the valve stem 23, as the tank is now relieved of its water and is in its upper position, thus opening the valve automatically and starting to refill the tank. As counterweight 31 descends, lever arms 28 strike stops 32 when 28 and 29 are in a substantially straight line, thus locking the tank 10 in its upright position. Counterweight 18 is also provided with a stop on which it rests when in its lowest position. The upward extension 33 of the receiving tank into which the discharge lip 7 of the measuring tank 10 projects, is for the purpose of insuring that all the water from tank 10 gets into the receiving tank as the former is tilted. This extension also forms a convenient location for the supply valve 22.

Having now fully described the form and mode of operation of my invention, what I claim is;

1. In a water weighing device, a weigh beam, a tiltable weighing tank carried by one arm of said beam, a counterpoise attached to the other arm of said beam, an inlet valve adapted to be engaged and opened by said tank when the tank is returned from its tilting position while in its highest position and to be released and closed as the tank sinks under the weight of water contained thereby, and means for tilting the tank.

2. In a water weighing device, a receiving tank, a tiltable weighing tank supported above said receiving tank, means for tilting said weighing tank to discharge its contents into said receiving tank, the supporting means for the weighing tank consisting of a weigh beam on one arm of which the tank is pivotally mounted and to the other arm of which an adjustable counterpoise is attached, and an inlet valve opened by the movements of the weighing tank as it is returned from its tilting position.

3. In a water weighing device, a receiving tank, a weigh beam pivotally mounted thereon, a water tank tiltably mounted on one arm of said beam and an adjustable counterpoise attached to the other arm thereof, an inlet valve mounted on said receiving tank and adapted to be engaged and opened by said weighing tank when the tank is returned from its tilting position in its higher position and to be released and closed as the tank sinks under the weight of water contained therein, and means for tilting said weighing tank to discharge its contents into said receiving tank.

4. In a water weighing device, a tank tiltably mounted, a lever arm connected to said tank by a link, said lever and link extending in substantially a straight line when the tank is in upright position, and a stop engaging said lever to prevent downward movement thereof.

5. In a water weighing device, a tank tiltably mounted, a lever arm connected to said tank by a link, said lever and link extending in substantially a straight line when the tank is in upright position, a stop engaging said lever to prevent downward movement thereof from said straight line position, and means connected to said lever to return the same to said straight line position after the tank has been tilted.

EDWARD W. BRACKENBURY.

Witnesses:
ARNOLD REUSS,
RAYMOND KRUEGER.

Copies of this patent may be obtained for five cents each, by addressing the "Commissioner of Patents, Washington, D. C."